United States Patent [19]

Shear

[11] Patent Number: 4,827,508
[45] Date of Patent: May 2, 1989

[54] DATABASE USAGE METERING AND PROTECTION SYSTEM AND METHOD

[75] Inventor: Victor H. Shear, Bethesda, Md.

[73] Assignee: Personal Library Software, Inc., Bethesda, Md.

[21] Appl. No.: 918,109

[22] Filed: Oct. 14, 1985

[51] Int. Cl.$^4$ .......................... H04L 9/00; H04K 1/00
[52] U.S. Cl. ........................................... 380/4; 380/25
[58] Field of Search ............................ 380/3, 4, 25, 16

[56] References Cited

U.S. PATENT DOCUMENTS

| | | | |
|---|---|---|---|
| 4,168,396 | 9/1979 | Best | 380/37 X |
| 4,232,193 | 11/1980 | Gerard | 380/36 |
| 4,306,289 | 12/1981 | Lumley | 380/4 |
| 4,319,079 | 3/1982 | Best | 380/37 X |
| 4,588,991 | 5/1986 | Atalla | 380/4 |
| 4,595,950 | 6/1986 | Löfberg | 380/16 X |
| 4,658,093 | 4/1987 | Hellman | 380/4 X |
| 4,685,056 | 8/1987 | Barnsdale, Jr. et al. | 380/4 X |
| 4,696,034 | 9/1987 | Wiedemer | 380/16 |
| 4,740,890 | 4/1988 | William | 380/4 X |
| 4,747,139 | 5/1988 | Taafe | 380/4 X |

*Primary Examiner*—Stephen C. Buczinski
*Assistant Examiner*—Linda J. Wallace
*Attorney, Agent, or Firm*—Nixon & Vanderhye

[57] ABSTRACT

A "return on investment" digital database usage metering, billing, and security system includes a hardware device which is plugged into a computer system bus (or into a serial or other functionally adequate connector) and a software program system resident in the hardware device. One or more databases are encrypted and stored on a non-volatile mass storage device (e.g., an optical disk). A tamper-proof decrypting device and associated controller decrypts selected portions of the stored database and measures the quantity of information which is decrypted. This measured quantity information is communicated to a remote centralized billing facility and used to charge the user a fee based on database usage. A system may include a "self-destruct" feature which disables system operation upon occurrence of a predetermined event unless the user implements an "antidote"—instructions for implementing the antidote being given to him by the database owner only if the user pays his bill. Absolute database security and billing based on database usage are thus provided in a system environment wherein all database access tasks are performed at the user's site. Moreover, a free market competitive environment is supported because literary property royalties can be calculated based on actual data use.

41 Claims, 5 Drawing Sheets

DATABASE USAGE METERING AND PROTECTION SYSTEM AND METHOD

The present invention relates to regulating usage of a computer database. More particularly, the invention relates to techniques for preventing unauthorized use of an electronic digital information database and for measuring the utilization of the database by authorized users.

Information conveyed in electronic form is rapidly becoming the most valuable of commodities. Electronic digital databases now exist for a variety of different applications and fields of endeavor, and many businesses presently rely heavily on their ability to access those databases.

The value of being able to instantaneously, electronically access important, accurate information cannot be overestimated. Many of our daily activities depend on our ability to obtain pertinent information in a timely fashion. While printed publications and electronic mass media together fulfill most of the average person's informational needs and most often are the only source for full-text reference information, just about any effort to access information can benefit from the vast information handling capabilities of the computer. In today's fast-paced world, we quickly come to insist on and rely upon the most thorough and up-to-the-minute information available —often made possible only by electronic data processing and informational management technology. On-line, public databases, now a two billion dollar a year industry, are a case in point.

As the "information explosion" continues its course, more and more people will become dependent on electronically-stored information and people will continue to be willing to pay premium prices (when necessary) for access to and use of such information because of its usefulness and value to them. Currently, the principal resource for large, electronic information data bases are on-line (public) data base services such as Dialog Information Services, Mead Data Central, Dow Jones Information Services, Source, Compuserve, and many others. Most on-line data bases are abstract and/or bibliographic in content, and many are used primarily to access the document locations of specified information, rather than for the recall of the original document full-text.

Historically, personal computers have been used primarily for word-processing, modeling, and, to a lesser extent, the structured data base management of records. Technology that enables the user of, for example, a personal computer to search for, locate, and retrieve topically related full-text information from vast full-text data bases would be extremely useful and valuable.

The only viable way to make some kinds of information (e.g., information which must be constantly updated) available is to maintain centralized databases and permit users to access the centralized databases through telephone lines or other communication means. Until very recently, this method has been the most cost-effective way to offer access to electronic databases. Access to a centralized database can be controlled relatively easily, and users can be charged for using a centralized database in accordance with parameters which are relatively easy to measure (i.e., the amount of time the user is connected to the database computer, the number and type of tasks the user requests, etc.). Moreover, because the database never leaves the central computer (each user is typically given access to only small portions of the database at a time), there is no danger of someone making unauthorized copies of the database.

However, centralized databases have important disadvantages. For example, it takes a relatively long time to manipulate information in a centralized database due to the relatively slow data transmission rates of standard communications channels and because the centralized database computer typically shares its resources among hundred or thousands of users at once. This can be a serious drawback if the user wishes to access a large volume of information or wishes to perform particularly complex data manipulation tasks. Also, it may take a long time during periods of peak database usage before communication can be successfully established with a centralized database computer, decreasing the utilization of the database and causing some users to become frustrated. Further disadvantages include the expense of establishing long-distance communications paths (e.g., WATS telephone line maintenance charges, long-distance direct-dial telephone charges, satellite channel costs, etc.) between distant user terminals and the central database computer, and the reliability problems associated with such communications paths. Moreover, the centralized computer facility needed to handle the access requests of many distant users simultaneously is extremely expensive to purchase and maintain.

With the advent of cheaper computer hardware and new, high density information storage devices (such as the optical disk and the bubble memory), it has become practical to give users their own copies of large and complex databases and permit users to access and manipulate the databases using their own computer equipment. Optical disks are capable of storing vast amounts of information at relatively low cost, are small enough to be sent through the mails, and can provide data at extremely rapid rates. Bubble memory devices provide some similar capabilities.

CD and related digital disk drives can currently store up to 225,000 pages of full-text information per removable diskette and can inexpensively maintain in excess of 1,800,000 pages of text simultaneously on-line. These technologies are ideal for personal computer information base libraries. CD drives use removable compact disks (essentially identical to an audio compact disk) the very low cost and enormous storage capacity has been predicted to result in an installed base of as large as one million drives to 10 million drives (including non-CD but related optical storage technology) by the end of 1990. Owners of "CD-ROM" and related drives will create an enormous demand for both lexical software and electronically published information base products. Mitsubishi Research Institute of Japan, for example, estimates that between 8,000 and 12,000 different CD-ROM publication titles will be on the market by the end of 1990.

Hence, it is now possible to store some databases on transportable, high-density information storage devices, and simply mail each user his own copy of the databases. The user can in this way be given exclusive access, via his own computer system, to local, on-site databases. Rapid access time is provided because access to the databases is exclusive rather than shared, and because data can be read from the database storage device by local high-speed I/O devices and transmitted over local high-speed I/O channels or networks. The stored databases can be updated periodically if necessary by sending the user storage devices containing a new version of (or new portions of) the databases.

It is very expensive to build a database. One way to recover the costs of constructing and maintaining a database ("Return On Investment", or ROI) is to charge a flat subscription or access fee to each user subscribing to use the database. If this is the only billing method used, however, infrequent users of the database may be discouraged from subscribing, because they would be asked to pay the same cost a frequent user pays. Thus, many database owners charge subscribers a nominal subscription fee, and then periodically (e.g., monthly) charge users a fee calculated in accordance with the amount the user has used the database.

While it is easy to measure the amount someone uses a centralized database (e.g., simply time each access session length and store the time information with user identification information), there is no convenient way to measure the usage of a database residing on a user's own computer, or to convey such usage information to the owner of the database. Techniques are known for automatically, electronically measuring consumption of a commodity such as electricity, water or gas, storing the measurements in a memory device, and periodically downloading the stored measurements over a telephone line to a central billing computer. Unfortunately, these known techniques are not readily adaptable to database usage metering, and moreover, are neither secure enough nor provide the security against database piracy that most database owners demand.

The prevention of unauthorized database usage becomes a huge problem whenever a stored database leaves the possession and control of the database owner. Computer program manufacturers lose millions of dollars each year to "pirates" who make unauthorized copies of software and distribute those copies for profit. Complex databases are often even more expensive to produce than programs, so that potential contributors of data base properties, as well as database owners themselves, may be extremely hesitant to permit electronic copies of their properties or databases to leave their control unless they can be absolutely sure no unauthorized copies will be made. The copyright laws and contractual licensing agreements may deter, but will not prevent, unauthorized use and copying of database.

SUMMARY OF THE INVENTION

The present invention provides a database access system and method at a user site which permits unauthorized users to access and use the database and absolutely prevents unauthorized database use and copying. The present invention also provides a facility for measuring usage of the on-site database for the purpose of billing the user according to the amount he has used the database, and for periodically conveying the measured usage information to the database owner (or his agent) --while preventing the user from tampering with the measured usage information.

The invention solves fundamental media based electronic publishing issues including:

Security of the information base. The present invention provides a code/decode Interlock System which includes both software and a tamper proof hardware module that prevents unauthorized and/or unmetered use of a protected information base. The present invention also supports a multi-level coded security access system limiting access to various portions of a data base only to those individuals possessing the proper security code(s); and Ascertaining the degree of usage of the information base. The present invention stores, in one of several alternative forms of non-volatile memory, the dates and times that any files (or documents, sections, properties, etc.) are accessed and also records the amount of information read from each file into memory by the user.

With the present invention, a CD-ROM disk, for example, might contain all issues of 10 separate publications (technical, medical, business, etc.) going back for five years. Each publisher would be able to set the price for the use of its publication or publications and each publisher could then receive a "copyright royalty" return-on-investment based on the actual customer usage of the publishers' products. Therefore, publishers contributing more important, popular or costly to develop lexical information base properties could earn revenues commensurate with the market demands and pricing strategies for their products.

The present invention eliminates the necessity of determining how much of the net revenue of a CD information base product each contributing publisher should receive (currently an issue of considerable concern to publishers). The present invention also ensures the data security of information bases—a critical, frequently voiced, and previously unanswered problem causing considerable publisher anxiety. It would be quite difficult (requiring a high level of specialized expertise and costly high-powered computers) to "break" the hardware/software data security system provided by the present invention and copy material without being charged an appropriate fee.

Publishers can license their products at an exceptionally low initial cost to customers (i.e. for a $25.00 initial fee instead of a $1,000.00 or more annual fee). Low initial licensing fees would result from the usage auditing capability of the present invention and would allow new clients to experiment with the product at little or no risk. Similarly, customers who anticipate a low level usage of a given information base product may find the lower costs of a usage based fee schedule a practical and affordable justification to acquire a product that would otherwise not be purchased.

In sum, the present invention will:

1. Significantly accelerate market penetration of electronically published products due to substantially lower initial license costs;

2. Greatly enhance the ultimate market penetration of CD published products by making CD publications affordable to a much larger body of customers; and 3. Produce higher ultimate revenues per published disk from those customers who would otherwise have purchased a costlier version of the database product.

The security protection provided by the present invention will give publishers significant advantages in securing exclusive contracts for important publishing information base properties, since the invention provides the information base property contributors with:

1. Vastly superior copy protection security;
2. Ultimately greater revenue;
3. Publisher specific control over pricing; and
4. A return-on-investment commensurate with the market demand for their information base property.

In accordance with one important feature of the present invention, a storage medium stores the database in encrypted form, and also stores index information which correlates portions of the encrypted database with index keys. The index information may itself be encrypted if desired. A host digital signal processor operatively connected to the storage medium is preprogrammed so as to generate a database access request, read the index information from the storage medium, identify (in accordance with the index information) the portions of the encrypted database which satisfy the access request, and read the identified encrypted database portions from the storage medium.

A secure decoder control logic device coupled to the host processor receives the encrypted database portions read by the host processor, decrypts portions of the encrypted database read by the host processor to produce corresponding decrypted information, and transmits the decrypted information back to the host processor. The decoder control logic device also measures the quantity of usage of and/or other parameters pertaining to the information decrypted by the decrypting device, and stores these measurements in a non-volatile (and in many cases tamperproof) memory device. The invention thus provides a detailed record of database usage—including a breakdown of usage of each file or "property" stored on a local storage medium. Additional decryption of database information can be prevented or disabled if more than a certain percentage of a database (or more than a specified contiguous portion of a database) has been copied by the user as an additional safeguard preventing unauthorized copying.

The system may further include means for preventing tampering with the memory device and/or the decoder control logic means.

In accordance with another important feature of the present invention, database usage information is stored at a user's site and is periodically communicated to a central billing facility. For example, the non-volatile memory device storing data indicating database usage may be housed in a replaceable module. Periodically, the user disconnects the module from his computer system and sends it to a centralized billing facility. At the centralized billing facility, the contents of the memory device are read and used to bill the user according to his database usage.

In accordance with yet another important aspect of the present invention, communications is periodically established between the user's site and a central facility for the purpose of telecommunicating database usage information stored at the user's site to the central facility.

In accordance with yet another important feature of the invention, the user is automatically prevented from decrypting the encrypted database after a predetermined event occurs (e.g., "expiration" of a memory module, or excessive database usage indicating copying attempts) unless the user has implemented an "antidote" (e.g., input secret information into his computer system and/or install a replacement component).

Because the database is stored in encrypted form (and/or the database directory is encrypted or otherwise coded), the only way to obtain useful database information is to decrypt portions of it using the tamperproof decrypting means of the invention. Safeguards may thus be used to prevent unauthorized database decryption.

Thus, the present invention resolves several fundamental problems that would otherwise impede the rate of growth of the CD-ROM and CDI electronic publishing markets. For example, it is a costly process to create the core properties that may be incorporated into an information data base, and the structuring of the data base itself may, in some circumstances, be a costly effort. One way for data base preparers to recover the costs of constructing and maintaining a database is to charge a flat subscription or access fee to each user subscribing to use the database. If this is the only billing method used, however, infrequent users of the database may be discouraged from subscribing —because they would be asked to pay the same cost a frequent user pays. Furthermore, potential users may be hesitant to pay a significant one time or initial fee to acquire a technology or product with which they are unfamiliar.

With the present invention, a user will be able to pay (if so structured by the data base provider) according to his usage of the product and both the perceived risk, as well as—in lower usage environments—the high cost of the use of the technology, can be reduced or eliminated. Furthermore, since the present invention should accelerate the installed base and revenue growth rate for a given product, it may enable costs for even the high volume users to drop as well.

Moreover, database use can be measured simply by measuring the quantity of information which is decrypted. Other parameters relating to database usage (e.g., which databases and/or database subdivisions have been used; and the time, date and duration of use of each database and/or subdivision) may also be monitored and stored. The stored usage information can be periodically communicated to a centralized facility for billing the user in accordance with his database usage. Moreover, the user's on-site database access system can be designed to cease functioning unless the user installs a new component and/or inputs "secret" information—and the centralized facility can provide the user with such replacement components and/or secret information only when the user has paid his bill.

Because the invention provides a detailed record of which literary properties have been used and how much each property has been used, use payments paid by the user may be fairly apportioned to the property owners according to actual use of their respective properties. For example, if a user licenses a storage medium storing a library containing hundreds of different literary properties and then uses only two properties in the library, the owners of those two properties can be paid substantially all of the licensing fees charged to the user.

A free market system is thus maintained in an environment not otherwise susceptible to free market competition. Publishers and authors can be assured that they will receive incomes based on customer demand for their properties, and publishers can retain absolute control over pricing—despite the fact that the properties are being distributed on a storage medium along with hundreds of other properties. "Best sellers" can still be distinguished from unpopular works, and authors can be paid royalties based on consumer demand for their works.

This invention thus solves the fundamental CD and Optical publishing problem of how to provide end-users with disk libraries containing many different publications from different vendors. Different properties from different publishers have differing significances in the today's marketplace. These products have prices which each reflect vendor investment, product specific market demand, and other vendor product marketing considerations. The present invention allows each vendor to set a price for their product(s) carried on CD or other media publications. The invention has an interlock system that prevents access to the non-volatile storage media (such as a CD-ROM disk) unless the user has contracted for the use of the disk and has a hardware plug-in module incorporating software.

When a customer makes use of stored data, the invention monitors which files are accessed and how much information is requested by the user to be displayed. In one embodiment of the present invention, information that is being reviewed or browsed may be distinguished from information that is read into a host computer for the purpose of copying, modifying, or telecommunicating, with different cost rates being applied to the different activities (so that, for example, the cost of browsing can be much less than the cost of copying or printing). Depending on the specific application and the nature of the user contract, the user might be required to:

1. Telephone the publisher once every three months, establishing a modem link over which a request is transmitted to telecommunicate back to the publisher the meter usage data; or 2. Mail to the publisher once every three months a removable EPROM module that contains the metered usage data.

The present invention thus prevents copying or browsing of a protected information base without adequate compensation to the publisher and its information base property (data) suppliers. Each supplier of information to an information base product receives a return on investment that reflects both the market demand for his specific property and the pricing and other marketing strategies that the supplier deems appropriate for his product.

The present invention allows very large numbers of customers to acquire library disks at very low initial costs, since the customer's billing can be largely based on usage, not simply possession of the library disk. As a result, potential customers, regardless of size or financing, will be able to maintain very broad based libraries on-site. If a given group regularly uses only a fraction of the information base, the group's users can still search the entire data base whenever appropriate. This means that most user billing is concentrated on those reference resources that the users frequently use, but an entire, comprehensive reference library extending beyond the user's frequent requirements is immediately available for use. A publisher will be in a much better position to provide large scale reference information base libraries. In many applications, the breadth and comprehensiveness of these encyclopedic libraries will encourage much more frequent use and a much larger body of users.

The present invention thus answers both the needs of a potentially very large customer base for low cost initial access to comprehensive digital disk based reference libraries, while at the same time maintaining supplier publisher control over pricing and guaranteeing an appropriate return on investment based on the customer's demand for their products.

The invention may be particularly attractive to the owners of the leading properties in a given vertical publishing market, since these owners are likely to be particularly sensitive to the issues of unauthorized access to and copying of their product, pricing of their product, and equitable return on the value of the contribution of their product to an information base library. These publishers are likely to greatly increase their revenues through participation in library publication and distribution in accordance with the present invention—and the presence of such publishers in the marketplace will make it economically necessary (and feasible) for other publishers who have second tier properties to contribute to the same information base product.

The present invention may also include an optional security system which allows an organization to prevent usage of all or a portion of an information base unless the user enters his security code. Multiple levels of security codes can be supported to allow restriction of an individual's access according to his security authorization level.

There is significant value in using the present invention with certain types of non full-text information bases. For example, an electronic, CD disk containing comprehensive telephone white pages, telephone yellow pages, and as additional options, individual specific additional information (including estimated income level, publications received, job type and position, social security number, and other information that is compatible and legally available from one or more of the various mailing list companies) might be used with the present invention.

As a result of the present invention, the telephone operating companies providing directory listings can be compensated on the usage of their data base, while the mail order companies can also receive a revenue stream based on both usefulness of their data bases usefulness to customers and the extent of customer usage of their information. The present invention provides, for the first time, a context in which firms such as telephone operating companies and other information property suppliers can safely and profitably supply information for desk-top electronic information base products.

BRIEF DESCRIPTION OF THE DRAWINGS

These and other features and advantages of the present invention will be better and more completely understood by referring to the following detailed description of preferred embodiments in conjunction with the appended sheets of drawings, of which.

DETAILED DESCRIPTION OF PREFERRED EMBODIMENTS

Figure 1:
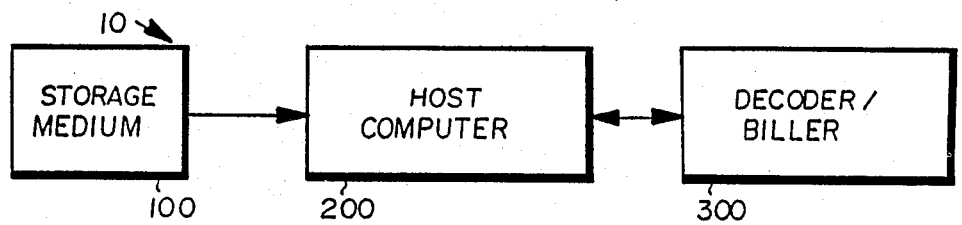
FIG. 1 is a schematic block diagram of a presently preferred exemplary embodiment of a database usage metering and protection system in accordance with the present invention.

FIG. 1 is a schematic block diagram of a presently preferred exemplary embodiment of a database usage metering and protection system 10 in accordance with the present invention. System 10 includes three main blocks: a storage medium block 100, a host computer 200, and a decoder/biller block 300.

Predefined database(s) is (are) stored on storage medium 100 in encrypted form, and selective portions of the database(s) are read from the storage medium by host computer 200 (several different databases can be stored on the same medium, although the present invention in its simplest form uses only a single stored database which may contain multiple files, segments, "properties" or the like). Host computer 200 may be a computer dedicated to the task of accessing the stored databases, but need not be (for example, the host computer can be a general-purpose digital computer used to do a variety of different tasks).

Figure 6:
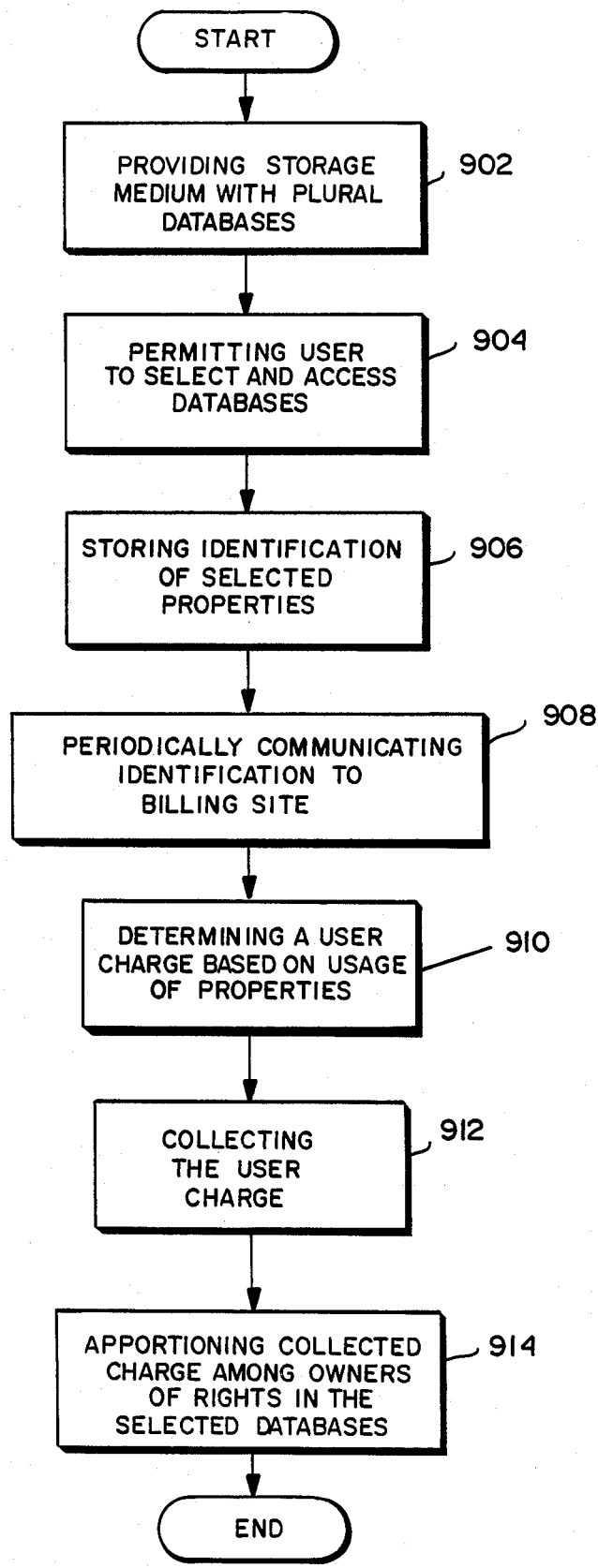
FIG. 6 is a flowchart of an overall method for relieving a return on investment from databases at the use site.

Decoder/biller block 300 is connected to host computer 200, and performs at least two important functions. Decoder/biller 300 decrypts portions of the stored databases on a user-need basis (e.g., after confirming the user has proper authority to access the databases) (see FIG. 6, block 904). Decoder/biller 300 also meters database usage, and generates usage information in a form which can periodically be conveyed to the owner of the databases (or his agent, e.g., a service company) (see FIG. 6, blocks 906-908). The usage information is typically used to calculate a database access fee the user is to be charged (see FIG. 6, blocks 910-914).

Decoder/biller block 300 may take the form of a hardware unit (or card) electrically connected to and located in proximity to (or within) host computer 200, or computer software executing on the host computer. Alternatively, decoder/billing block 300 might be located remotely to host computer 200 and communicate with the host computer via a data communications network or a telephone line.

Storage medium 100 is preferably some form of inexpensive mass digital information store (e.g., an optical disk, a bubble memory or a large hard disk or other fast transfer rate magnetic storage technology) prepared by the database owner and licensed to the user for use. CD-ROM, CDI, WORM, and other related optical/digital very large capacity storage modalities are now coming to the personal computer market and can be used for this purpose. These products are highly reliable, and very economically store hundred of megabytes up to multiple gigabytes of data.

For example, a CD-ROM diskette stores 550 megabytes of information on a single 12 centimeter laser diskette. CD-ROM technology now being released to the market will economically support up to eight parallel drives (4 gigabytes or 1,800,000 printed pages) and will access any desired sector in one second. In the next several years, technological advances should reduce access time to ¼ second, and storage capacity will be doubled (450,000 pages per diskette and 3,600,000 pages on-line) if CD-ROM manufacturers decide to market double-sided disks and drives. CD-ROM, CDI, and WORM products will be increasingly affordable over the next 30 months, with CD-ROM prices estimated to drop from $800.00 to $400.00 or less per drive, including controller, and OEM and volume prices estimated to drop to as low as $175.00 per unit by 1990. With CD-ROM, WORM, and other optical/digital technologies, users can both purchase large scale information bases and also themselves easily build organization-specific information bases.

The database is preferably "preprocessed" and then stored onto medium 100. The type of preprocessing performed depends upon the database and the application, but typically includes creating an encrypted rendition of the database and loading the encrypted rendition onto medium 100. One or more of the many sophisticated conventional data encryption schemes which presently exist can be used for encrypting the database. Preprocessing preferably also includes generating an index to the database and storing the index together with the encrypted version of the database on the storage medium 100. The index may or may not be encrypted.

The preprocessed database may be loaded onto storage medium 100 in a conventional fashion. For example, a "master" medium may be prepared, and then simply duplicated to yield a number of duplicate storage media 100. Storage of the entire preprocessed database (or databases) may require several storage medium units (i.e., several optical disks), each unit storing a part of the database. The database can index one or more databases each containing one or more files, documents or "properties" (the term "properties" referring to a literary or other textual work protected by copyright).

Figure 2:
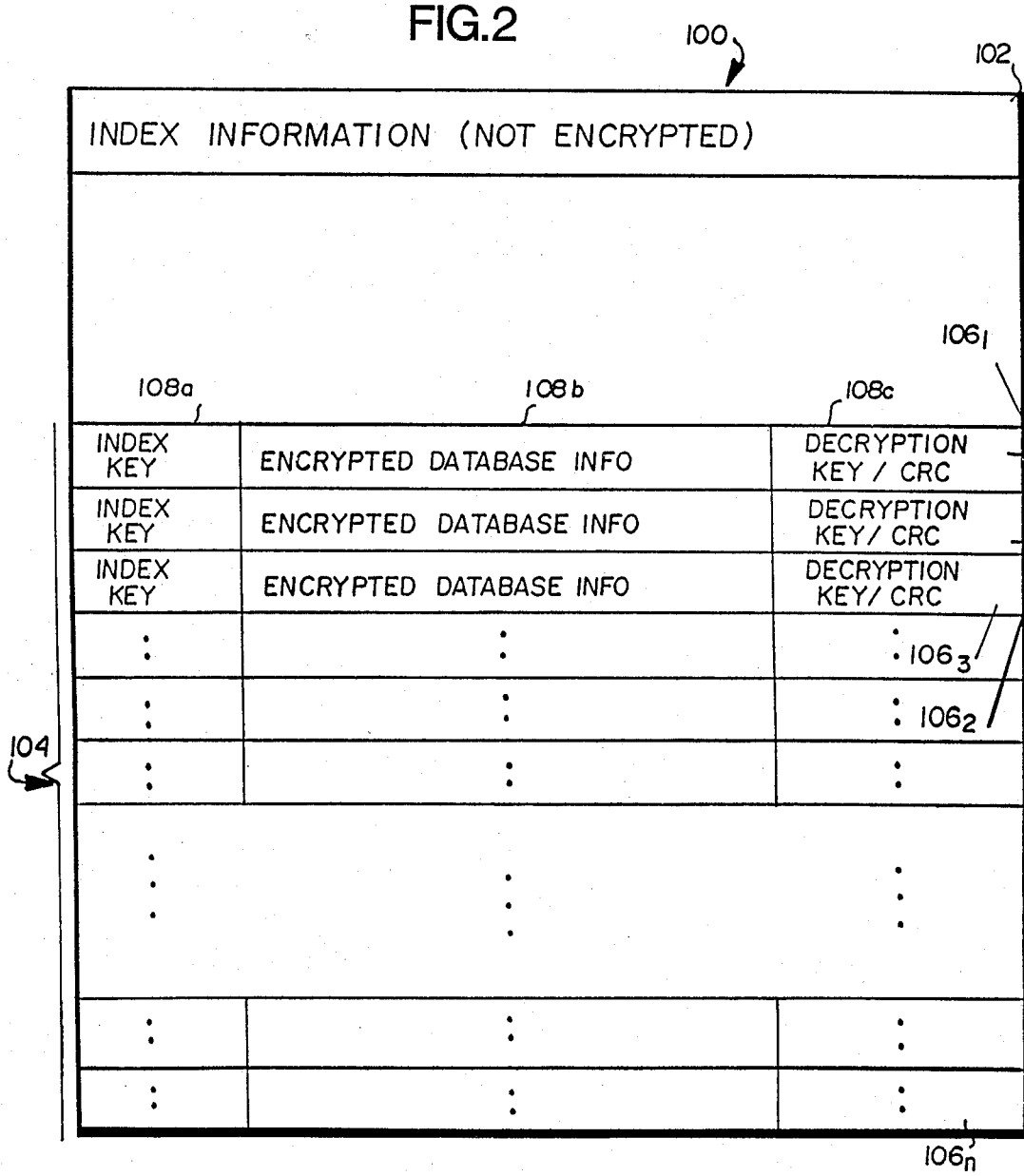
FIG. 2 is a schematic block diagram of the information stored in the storage medium block shown in FIG. 1.

FIG. 2 shows one exemplary scheme for storing database information on medium 100. The information stored on medium 100 includes an index portion 102 and an encrypted database portion 104. Database portion 104 includes a plurality of predefined quantities, or "blocks", 106 of digital data. Each block 106 includes three information "fields" an index key field 108a; an encrypted database information field 108b; and a decryption key/error-checking field 108c.

Index portion 102, which may be encrypted, provides information used to translate a database access request into the addresses of one or more blocks 106. The contents of index portion 102 depends on the type of database stored on medium 100 and the type of operations which are to be performed on the database. For example, if word or string searching is to be provided, index portion 102 may include a list of all of the words contained in the database and the blocks 106 in which the listed words appear. Index portion 102 may alternately (or also) include a "table of contents" of the database and a designation of the blocks 106 covering each entry in the table. Other ways to index a database are known, and the present invention is not limited to any particular indexing scheme.

Index key 108a of each block 106 stores data which can be referenced in accordance with information stored in index information portion 102. Index key 108a may be explicit (e.g., a digital data word representing an indexing code or address) or implicit (e.g., physical "addresses" of storage medium 100 may themselves be used as indexing keys).

Encrypted database information fields 108b contains predetermined portions of the encrypted database. The size of these portions may be determined by the particular hardware and/or encryption techniques used, and is preferably (but need not be) fixed. If the nature of the database permits, logically-related information should be stored in the same blocks 106 (i.e., the database should be presorted and hierarchically organized) to reduce the number of accesses of storage medium 100 required to respond to a single user request. Techniques for organizing databases are known to those skilled in the art of information retrieval and database design and management.

Decryption key/error-checking field 108c performs two functions in the preferred embodiment. First, it provides conventional error checking (e.g. CRC or parity) information useful for detecting information reading errors. Secondly, the field may provide information needed by sophisticated data decryption schemes to decrypt the information stored in associated field 108*b*. In many data decryption schemes, a decryption key word (which may itself b encrypted) carried with the encrypted data is used in conjunction with an additional data decryption key generated by the data decrypting device to decrypt the data. Field 108*c* may or may not be required depending upon the error checking and decryption schemes employed.

Host computer 200 contains resident software and hardware which provides an interface for all database transactions. Computer 200 includes one or more appropriate I/O handlers and associated hardware device drivers which permit the computer to read information from storage medium 100. Host computer 200 also includes appropriate data communications software and associated hardware which permits it to exchange data with decoder/biller block 300. The data communications pathway between host computer 200 and decoder/biller block 300 may be a shared data bus, a dedicated I/O channel, a shared data communications network, or the like.

When a user requests information from the database stored on storage medium 100, the computer program resident on computer 200 controls hardware of the computer to read the index information 102 stored on medium 100 in order to ascertain which database blocks 106 contain information specified by the user request. The computer program then controls host computer 200 to load one or more blocks 106 of the stored database information into the host computer memory. The host computer 200 then, under software control, strips off the contents of encrypted fields 108b from the blocks of information now resident in its memory (along with some or all of the contents of decryption key/CRC field 108c) and sends some or all of this information to the decoder/biller block 300 for processing.

Because the index portion 102 is not encrypted, host computer 200 can manipulate the index information without involving decoder/biller block 300. Although this is an important advantage in some applications (since the user is permitted to "browse" through the index "for free"), other applications may demand a level of security which is comprised by providing an unencrypted index. For example, unencrypted, very complete indexes might be used to reconstruct significant portions of the database itself. It may therefore be desirable to encrypt index portion 102 as well as database portion 104 to provide higher security.

If index portion 102 is encrypted, it must be decrypted before a user can make selections from it or otherwise use it to locate blocks 106. Decryption of index portion 102 should be performed in a secure environment (such as in decoder/biller block 300, or in a dedicated "browsing workstation" to be discussed in connection with FIG. 5). Alternatively, decoder/biller block 300 may temporarily provide host computer 200 with the decryption key information needed to decrypt index portion 102 (the index portion may be encrypted using an encryption technique which is different from the one used to encrypt database portion 104), and the host computer can decrypt sections of the index portion as needed by the user.

In one possible permutation of the invention, neither the database nor the index stored on medium 100 is "encrypted" using a formal encryption algorithm, but instead, the manner in which the database and/or the index is stored on the storage medium is itself used to make information incoherent unless it is read from the medium using a predefined access algorithm.

For example, records of the database may be non-contiguously stored on a medium in a pseudo-random order, so that sequential reading of records produces only incoherent information. An index stored on medium 100 contains the information needed to locate logically sequential database records. This index ("directory map") may also be in some way "scrambled" (for example, encrypted using formal encryption techniques, perhaps simply incomplete so that it must be supplemented with information and/or algorithms contained in decoder/biller block 300, or another scheme can be used to properly interpret the directory map, directory map interpretation being necessary to determine the locations on medium 100 of the components of a given database or other "property"). Different index scrambling schemes can be used for different copies of storage media 100 to prevent development of a "universal" de-scrambling device or algorithm.

Decoder/biller block 300 measures the amount and/or type of information sent to it for decryption and stores information indicating database usage over time from such measured amounts. Decoder/biller block 300 stores all necessary billing and usage information in a protected, non-volatile memory device (or in a protected, non-volatile storage facility within the host computer 200) for later retrieval and use in calculating database usage fees.

Because the database information read from medium 100 is useless unless it is first decrypted, and decoder/biller block 300 is the only portion of system 10 which is capable of decrypting the encrypted database information, the decoder/biller block can accurately meter the amount and nature of the data accessed from the stored database (e.g., by counting the number of blocks 106 which are encrypted, determining the group of logically related information ("property") stored on medium 100 which is logically associated with the data being decrypted, and/or determining other convenient parameters indicating the quantity and/or identity of data which is decrypted). Decoder/biller block 300 decrypts the information sent to it, and returns the decrypted information to host computer 200 for display, storage, printing, telecommunications, or the like (or otherwise makes the decrypted information available to the user).

Figure 3:
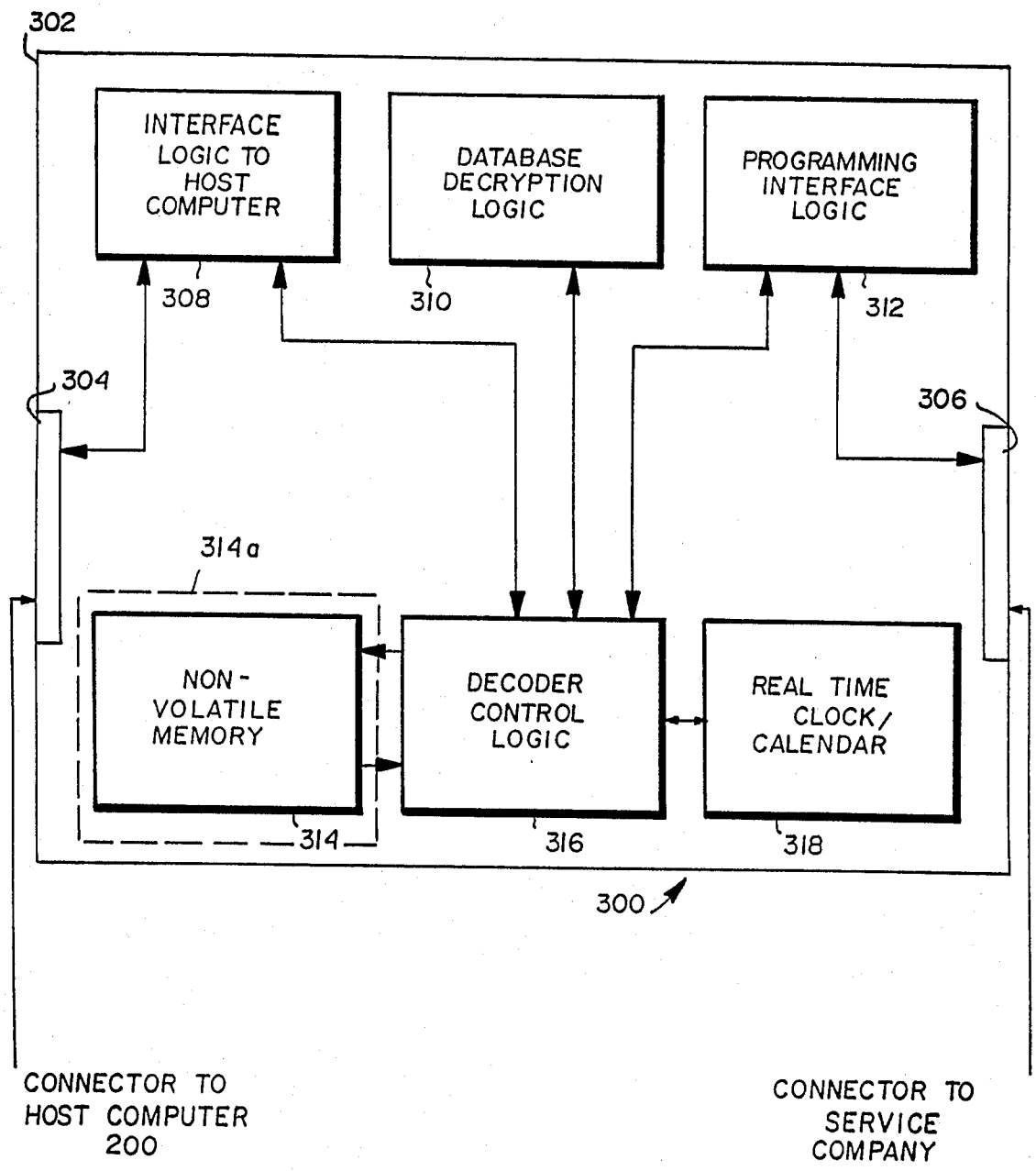
FIG. 3 is a more detailed schematic block diagram of the decoder/biller block shown in FIG. 1.

FIG. 3 is a more detailed schematic diagram of the decoder/biller block 300 shown in FIG. 1. Block 300 includes the following: a tamper-proof mechanism 302; a data connector 304 for connection to the host computer 200; a data connector 306 for connection to an off-site service company; host computer interface logic 308; database decryption logic 310; interface logic 312; a non-volatile memory 314; decoder control logic 316; and a real-time clock/calendar 318.

Tamper-proof mechanism 302 prevents unauthorized persons from electronically or mechanically tampering with decoder/biller block 300, and preferably includes both mechanical and electronic safeguards. For example, the physical enclosure which encapsulates the components of block 300 should prevent unauthorized individuals from accessing the enclosed components. The components can be epoxied or potted if desired, and/or the enclosure can be provided with a mechanical seal which clearly evidences any tampering.

Another safeguard against tampering can be provided by implementing one or more of functional blocks 308-318 in the form of a custom integrated circuit. Such custom integrated circuits are not easily reproducible by an unauthorized person, nor could functional equivalents be designed ("black-boxed") so long as the techniques used to encrypt and decrypt the database are sophisticated. This level of data encryption sophistication is well within present technology.

Connector 304 and interface logic 308 communicate data between decoder/biller block 300 and host computer 200. Interface logic 308 includes conventional electronics which interface host computer 200 with decoder control logic 316. Interface logic 308 is electronically connected to physical electronic connector 304, which in turn is connected to a mating connector of host computer 200.

The exact configuration of interface logic 308 and connector 304 depends upon the nature of host computer 200 and sort of data communications pathway desired. For example, in one exemplary arrangement, connector 304 comprises a host computer bus connector (connected to the main bus of host computer 200 and addressed directly by the host computer processor) and interface logic 308 comprises a bus interface. Of course, connector 304 could comprise a standard R-232 port connector and interface logic 308 could comprise conventional port interface logic—or the interface logic could comprise a communications controller (e.g., a data communications network controller or a modem) and the connector 304 could be a standard communications connector (if decoder/biller block 300 were located remotely from host computer 200).

Other communications connectors and/or ports might be used for connector 304, the specific arrangement used being chosen based on the application, convenient performance and/or cost. Other possible arrangements, including placing the decoder/biller block 300 into the same housing containing the drive which accesses medium 100, or connected to (or actually connected as part of) cabling connecting the drive for medium 100 to host computer 200, can be used.

Decoder control logic 316 preferably includes a conventional microprocessor pre-programmed with a predetermined control computer program, but might be implemented in other ways (e.g., as a discrete digital logic sequential state machine). Decoder control logic 316 controls all of the functions of decoder/biller block 300 in the preferred embodiment. Decoder control logic 316 also monitors database usage, produces digital data indicating the amount of such usage, and stores this data in non-volatile memory 314 for later retrieval (e.g., by a service company or the database owner).

Real time clock/calendar 318 permits database usage metering to indicate the time and date of each usage and the duration of usage, thus providing an important audit tool for both customers and the service company. In addition, this real-time clock/calendar 318 can be preprogrammed to allow the user to access certain databases only at pre-programmed times (e.g., by limiting access for given user security access codes).

Interface logic 312 and connector 306 may be used to communicate data with an off-site facility, such as the centralized computer of the database owner or a service company which handles periodic database usage billing. In one exemplary embodiment, connector 306 includes a standard telephone connector and interface logic 312 includes a standard modem. If desired, connectors 304 and 306 may comprise the same connector, and interface logic 308 and interface logic 312 may comprise the same components.

Database decryption logic 310 takes input digital data signals provided to it by decoder control logic 316 (these signals representing encrypted digital data read by host computer 200 from storage medium 100 and passed to the decoder control logic via connector 304 and interface logic 308), decrypts these digital data signals using a predefined decryption algorithm, and outputs decrypted data signals to the decoder control logic for display, printing, and the like. One or several different predefined decryption algorithms can be stored in (or hardwired within) decryption logic 310, and additional decryption algorithms can be downloaded into the decoder/biller block 300 as needed or required via interface logical 312.

Many conventional methods of encrypting/decrypting data are known, spanning from simple lookup tables to complex mathematical algorithms. The method of data encryption/decryption used depends on the amount of extra computer processing overhead and data storage space that the application will allow. It is not uncommon for substantial overhead to be needed to handle encrypted data.

To install system 10, storage medium 100 (along with its associated drive/access device) is connected to host computer 200, and decoder/biller 300 is also connected to the host computer port and/or bus (by connecting connector 304 as described). A non-volatile memory 314 is provided which has been preloaded with the following information (or is loaded upon installation):
 (a) database key(s) and/or user password(s);
 (b) billing rates (optional—may be performed by the database owner at his own facility);
 (c) expiration date and "antidote" information; and
 (d) user identification(s)/security levels (if desired).

Figure 4A:
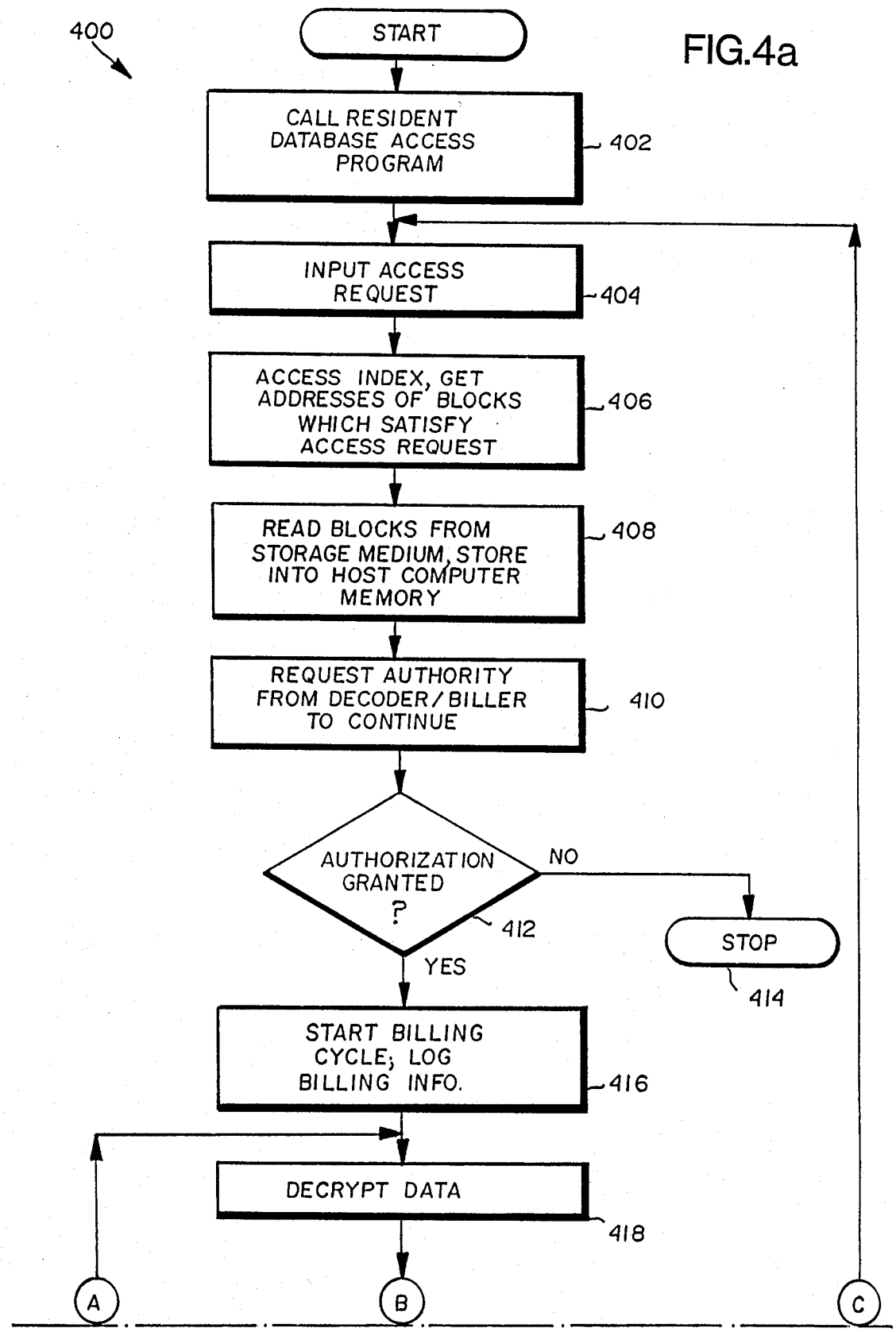
FIGS. 4a–4b are together a flow chart of the steps performed by the system shown in FIG. 1.
Figure 4B:
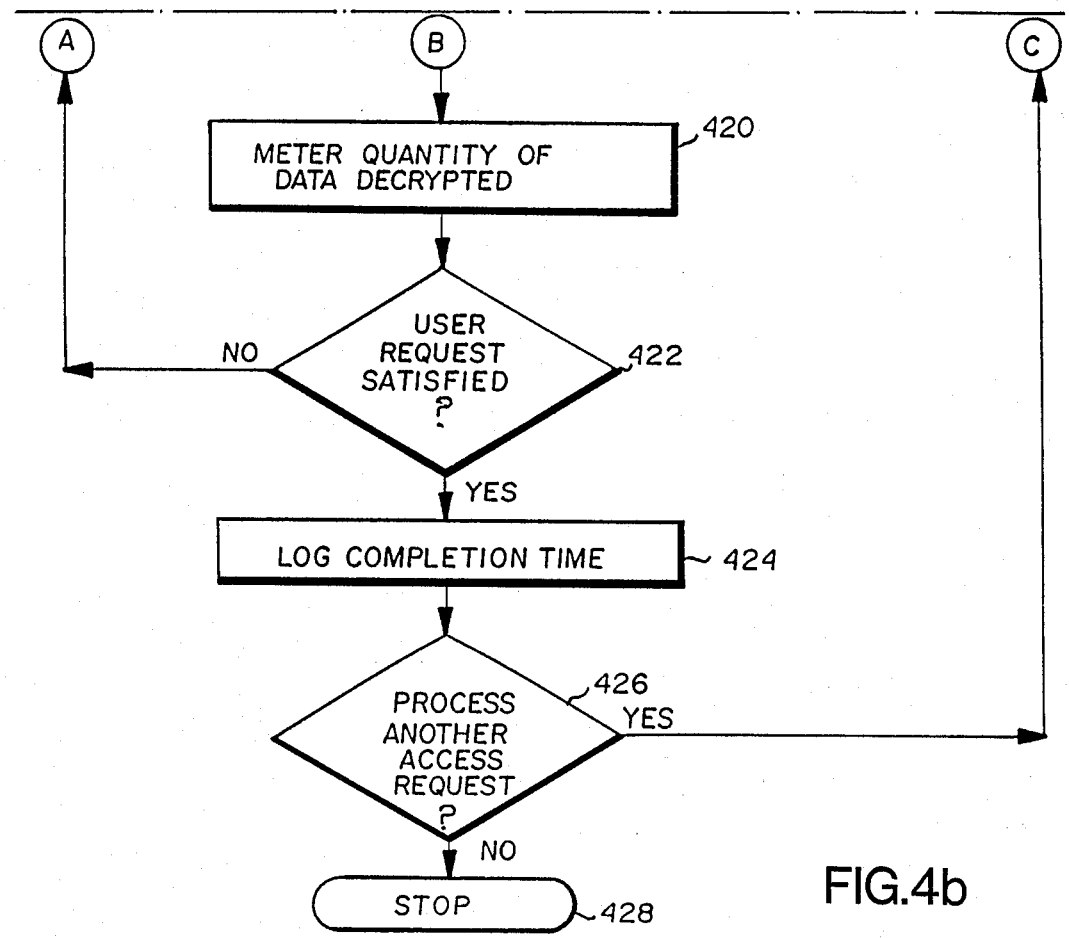

FIGS. 4(A)–4(B) are together a high-level flowchart of the routine 400 performed by system 10 to access a portion of the stored database.

To access database information, the user causes host computer 200 to execute software resident within it which permits the user to formulate a database access request (block 402). As discussed above, the nature of the access request depends on the nature of the database and the needs of the user. Most users require the ability to perform lexical database searches (i.e., searches for words, strings, and the like). However, other methods of accessing information are also possible. For example, if the database is a literary novel, the user's access request might be a chapter number and/or page number. Personal Library Software, Inc. of Bethesda, Md., offers advanced indexing software technology which allows a user to perform both keyword and topical searches (contrasting with other commercial products, which are limited to keyword searching techniques). Personal Library software can be used to great advantage with the present invention.

The user then inputs an access request (block 404) using a keyboard or other standard I/O device connected to host computer 200. In response to the user's access request, host computer 200 accesses index portion 102 stored on medium 100 and obtains from the index portion the addresses of (or index keys corresponding to) each block 106 of the encrypted database which satisfies the user's access request (block 406) (index portion decryption is performed at this time if necessary). Host computer 200 then reads the appropriate block(s) 106 of the encrypted database from storage medium 100 and stores these blocks of information into its own internal random success memory (block 408).

System 10 may require the user to input identification and/or password information along with his access request (block 404). System 10 checks the authority of the user to access the database by transmitting the inputted ID/password information to decoder/biller block 300 for comparison with a list of authorized IDs/passwords stored in memory 314 (block 410). If decoder/biller block decoder control logic 316 denies authorization to continue with database access (because the inputted user information is incorrect, because the access request cannot be performed at the current time/date, etc.) (block 412), the decoder/biller block refuses to decrypt any data sent to it (block 414)—and may cease communicating with the host computer 200, and/or simply ignore any encrypted information the host computer sends it. While encrypted database information is already present in the memory of host computer 200, this encrypted information is incoherent and cannot be used for nay useful purpose.

On the other hand, if decoder control logic 316 of decoder/biller 300 grants authority to proceed (block 412), the decoder control logic begins a "billing cycle", and stores information logging the billing cycle into non-volatile memory 314 (block 416). The information stored in memory 314 may include: (a) the name of the database file being accessed; (b) the section of the database being accessed (name, "property designation", file name, or other identification information); (c) the identification of the user accessing the database; and (d) the date and time the database access beings.

The information stored in non-volatile memory 314 may thus be used to create an "audit trail" which tracks different users (or groups of users) and their database usages. Special use passwords may be required to access selected databases, and actual use of all databases may be verified later from the information stored in memory 314. Such stored information is extremely valuable not only to help detect unmonitored database use, but also to allow detailed bills to be generated and to help determine which users among multiple users are responsible for generating usage charges. Such a detailed audit trail can be used to allow publishers and users to determine the detailed activities of users. This information can be used by users to determine what they are being charged for. The audit trail information can also be used by publishers and property owners to conduct marketing surveys—providing more detailed information about user demographics and information use than is presently available.

In addition, it may be desirable to code storage medium 100 (or particular databases or files stored on the medium) with unique (e.g., randomly-generated) user passwords by embedding secret password information in the database information. Non-volatile memory 314 can store information which matches the code associated with the particular copy of the storage medium licensed to a particular user. This coded information can be encrypted, and coding schemes and/or coded information may be changed periodically. Different users can be assigned different codes to prevent users from exchanging or sharing storage media 100.

This additional security feature also impedes the use of unauthorized decoder units (e.g., clandestine units manufactured to be similar to block 300). Such unauthorized units would not be equipped with the correct coded information, and even if they were, would work for only one similarly coded storage medium (or for only one or a few databases stored on a particular storage medium). The coding of storage medium 100 with embedded, user-identifying codes would also help to identify how any unauthorized copies of the database information came into being, since the coded information would be embedded in the database information itself and would thus also be present in any copies made from an original. Users found in this manner to be involved in copyright infringement could be penalized appropriately under the civil and criminal penalties of the copyright law, as well as for breach of their contractual obligations.

Decoder control logic 316 also is enabled at this time to begin (a) decrypting information sent to it by host computer 200 and (b) sending the decrypted information back to the host computer (block 418). Decoder control logic 316 meters the quantity and/or other usage parameters of data which is decrypted, and stores this usage information into non-volatile memory 314 along with the other billing information (block 420) (the decoder control logic may store quantity information directly into the memory, or may first convert it to billing information taking into account, for example, the cost of using the database file being accessed). This process continues until the user's request has been satisfied (as tested for by block 422).

The user can be billed an annual fee for unlimited use of some databases or database properties, and billed only for actual use of other databases or database properties. In this way, the user can pay a flat fee for the databases, or specific database properties or "books", he uses most often, and yet have access on a "pay-as-you-go" basis to other databases which he might use occasionally but not enough to justify paying the cost for unlimited use. This billing method provides the user with database resources he might not otherwise be able to afford, and also stimulates use of databases which are not used often but are nevertheless extremely valuable at times.

The specific steps performed to decrypt data (block 418) depends on the particular data encryption/decryption scheme used. Host computer 200 transmits encrypted data in predetermined quantities (e.g., fixed-length blocks) to interface logic 308 via connector 304 in the preferred embodiment. Interface logic 308 communicates this encrypted data to decoder control logic 316, which communicates it to data encryption/decryption logic 310. Logic 310 translates the encrypted data into intelligible information using a predetermined conventional decryption algorithm, and communicates the decrypted data back to decoder control logic 316. Decoder control logic 316 then communicates the decrypted data to host computer 200 via interface logic 308 and connector 304.

The database access program resident in the host computer then controls the host computer to display and/or print the decrypted information. If desired, the program resident in the host computer 200 can prevent the user from doing anything other than displaying (and/or printing) the decrypted data. Alternatively, this program may permit the user to manipulate the decrypted text (e.g., store the data in a disk file or in the memory of the host computer) to permit the user to browse through full-text data at his leisure and/or to use this data for word processing, telecommunicating, or the like.

Decoder control logic 316 meters database usage (block 420) by, for example, measuring the amount of information which is decrypted (e.g., by counting the number of fixed-length blocks which are decrypted; determining the source documents the decrypted information is associated with; and measuring the time, date and/or duration of access of the decrypted information). Control logic 316 may also record other billing information, such as the length of the database file being opened. Control logic 316 may be arranged to recognize the names or other designations of subsections of the database being accessed, allowing for different billing rates depending on the type or supplier of the information (so that use of more expensive databases can be billed at higher rates).

It may be desirable to not bill users for simply searching through the database (or at least, not bill at the full rate), but to bill only or at a higher rate for data that is decrypted and displayed, printed or communicated. It is for this reason that the database index is not itself encrypted in one embodiment—so that the user can browse through the index "for free" (or at a lower charge). As mentioned previously, however, it may be desirable in some instances to provide additional security by encrypting the index as well as the database. If decoder/biller block 300 decrypts the index, it can meter index usage and store this usage information into non-volatile memory 314—thus permitting the user to be billed for index browsing at comparatively low rates. A dedicated "browsing terminal" (to be discussed shortly) may be used in some applications to provide a secure environment in which browsing can occur and billed at a rate which may differ from that for database information usage (e.g., printing, telecommunicating, copying, etc.)

After the user's access request has been satisfied (as tested for by block 422), the decoder control logic stores, into non-volatile memory 314, the time the user finishes accessing the database. (block 424). The resident program then allows the user to input another access request (using the same or different database) (block 426). If the user does input another access request, the steps of blocks 404–426 are performed again (with blocks 416, 420 and 424 causing an additional billing log entry to be stored in memory 314).

The information stored in memory 314 is periodically communicated to the service company and used to bill the user for database usage. In one exemplary embodiment, memory 314 is housed in a storage module 314a which is easily separable from system 10. Periodically, the user disconnects memory module 314 from decoder/biller block 300, mails the module to the service company, and installs an alternative replacement module (the "next" module) into system 10. Decoder control logic 316 disables data decryption unless a module 314a is connected to it (and perhaps also when the control logic has determined the non-volatile storage area is nearly full).

In another embodiment, communications between decoder/biller block 300 and the service company is periodically established for the purpose of downloading the contents of memory 314 to the service company billing computer. If connector 306 and programming interface logic 312 comprise a conventional standard telephone connector and associated modem, such communications can be established over standard telephone lines. The information stored in memory 314 is transmitted over the telephone line to the service company computer, and the service company computer then transmits commands which control decoder control logic 316 to reset the memory. In addition, the service company can establish communications with decoder/biller block 300 to monitor use of the databases stored on medium 100 (and detect misuse and unauthorized use). The service company may also control decoder/biller block 300 remotely (e.g., to disable it from operating if customer fails to pay his bill).

System 10 may include an enabling/disabling mechanism which prevents a user from accessing the stored database information if he fails to pay his bill. For example, in the embodiment discussed above having a separable memory module 314a, the service company can refuse to mail the user a replacement module until all outstanding balances are paid. If the customer fails to pay his bill, he will eventually fill up the memory module he has installed, causing decoder control logic 316 to disable data decryption (or alternatively, the modules 314a can be electronically date-coded, and the decoder control logic can refuse to permit decryption to be performed when the module data code is determined to be prior to the current date generated by real time clock/calendar 318).

Decoder control logic 316 can be disabled from operating if the real time clock ever ceases to operate (for example, the clock may be battery powered and the battery might go dead after a year or so if scheduled preventive maintenance is not performed). Once the real time clock is repaired, a communications link can be established between decoder/biller block 300 and the central facility. The central facility can then read the contents of non-volatile memory 314. If no suspicious or unauthorized activities have occurred, the central facility can reset real time clock 318 or check a locally set real time clock to permit normal database decoding operations to resume.

Another arrangement can control decoder control logic 316 to periodically, automatically change authorized passwords—and the service company can refuse to tell the customer the new passwords until the customer has paid his bill.

Alternatively or in addition to the arrangements discussed above, system 10 may be provided with an automatic "self-destruct" mechanism which automatically "destroys" a critical part of the system (e.g., the information stored on medium 100, or the password table stored in non-volatile memory 314) at a preset real time deadline (timed by real time clock/calendar 318) unless the customer implements an "antidote" (e.g., inputs a series of secret code words) prior to the deadline. The service company can provide antidote instructions only to customers who have paid their bills. This automatic "self-destruct" mechanism can also be activated whenever the customer exceeds a predetermined maximum (and/or minimum) usage limit (so as to prevent a customer from running up a huge bill, from attempting to decrypt and store substantial portions of the unencrypted database, or from continuing to use the database in the unlikely event that he has successfully prevented the logging of usage information). If additional protection against database piracy is desired, the automatic "self-destruct" mechanism can also be activated whenever the user attempts to access, in one session or over a number of different sessions or within a given time frame, more than a certain percentage of a given database and/or more than a certain number of contiguous blocks of (or logically related records or other subdivisions of) the same database. A permanent record of the blocks (records or other subdivisions) which have been accessed may be retained in non-volatile memory 314 so that the user can be prevented from copying an excessive amount or selected database properties or segments over a period determined by the database owner.

It may also be desirable to enable the user to program parameters stored in non-volatile memory 314 which limits the user's own use of database information stored on medium 100. The routine shown in FIGS. 4(A)-4(B) can provide a user interface with decoder/biller block 300 which permits a user to optionally store, in a user-accessible file within memory 314, information representing ceilings on database usage or cost of usage over a period of time (e.g., a maximum monthly duration or cost for database usage, limitations on the type of information which can be decrypted, etc.). Decoder/biller block 300 keeps a running total of the parameter(s) the user has specified, and ceases decrypting database information if the total exceeds the user-specified parameter value. This feature permits the user to budget his database use, and is especially valuable in a business environment—since it permits an organization to directly limit the cost of database access by employees to an amount selected by the organization.

Although the embodiment shown in FIG. 1 is particularly suited for installation at a customer site, some applications might necessitate that decoder/biller block 300 and storage medium 100 be operated remotely to the customer site and communicate information to the customer via a communications link (e.g., a standard telephone line). In this "direct connect decryption" mode of operation, data decryption is performed at a central facility of the service company. Since only a small portion of the database is decrypted at any one time, a telephone line provides sufficient bandwidth to transmit the decrypted data at rates suitable for display by the customer's computer.

Using the "direct connect" mode, there is no need for periodic exchange of service storage modules or for pre-scheduled periodic communications with the local host computer. Billing data could be accrued in real time, and the service company could disconnect or change the service of a customer at any time. Database updating is also simplified, and current information or changing data is always at hand (since it can be automatically included in a user database search). Moreover, the user can use just about any kind of computer to access the service company central facility. Furthermore, the connect time charges for communication networks are becoming more competitive in price, making this "direct connect" mode attractive for some applications.

The chief disadvantages of this "direct connect" approach are: Database access speed is much slower than in the locally-installed embodiment discussed above (because of the shared nature of the central facility and because of the relatively low data transmission rate of standard telephone lines); communications costs are much greater; and the service company must purchase and operate an expensive multi-user computer facility.

The "direct connect" and the locally stored database features might be used together in some applications. For example, the bulk of a database can be stored on and accessed locally from a local storage medium 100. Database update file information can be stored and updated at a remote centralized facility and accessed via a telecommunications link to provide extremely current information in addition to the "older" information provided on-site.

There are thus both advantages and disadvantages to the "direct connect" mode. This mode may be offered as an option for users who require up-to-the-minute updated databases.

Once data is decrypted and stored into the memory of host computer 200 (e.g., for searching or manipulation rather than simply for display), it is susceptible to being intercepted by a "pirate" intercept program. System 10 bills for the data which is decrypted (so that the user would run up a huge bill if he tried to copy a large portion of a database). Nevertheless, it may be desirable in some applications to restrict the manner in which a customer can use decrypted data, while at the same time not restricting manipulations (e.g., browsing) of the decrypted data.

For example, keyword searching does not require a data image of the database (rather, it is most efficiently performed using index information 102). However, other search techniques (e.g., final "zooming in" of the information being searched for) may require manipulation of a data image. It may be desirable to absolutely prevent the user from copying the decrypted data image information. However, the user should be able to manipulate data images in other ways (e.g., by browsing through full-text data and the like). It may be impossible to impose such restrictions on data stored in the user's own host computer 200 (or the user may be able to easily defeat such restrictions once imposed through skillful programming techniques).

Figure 5:
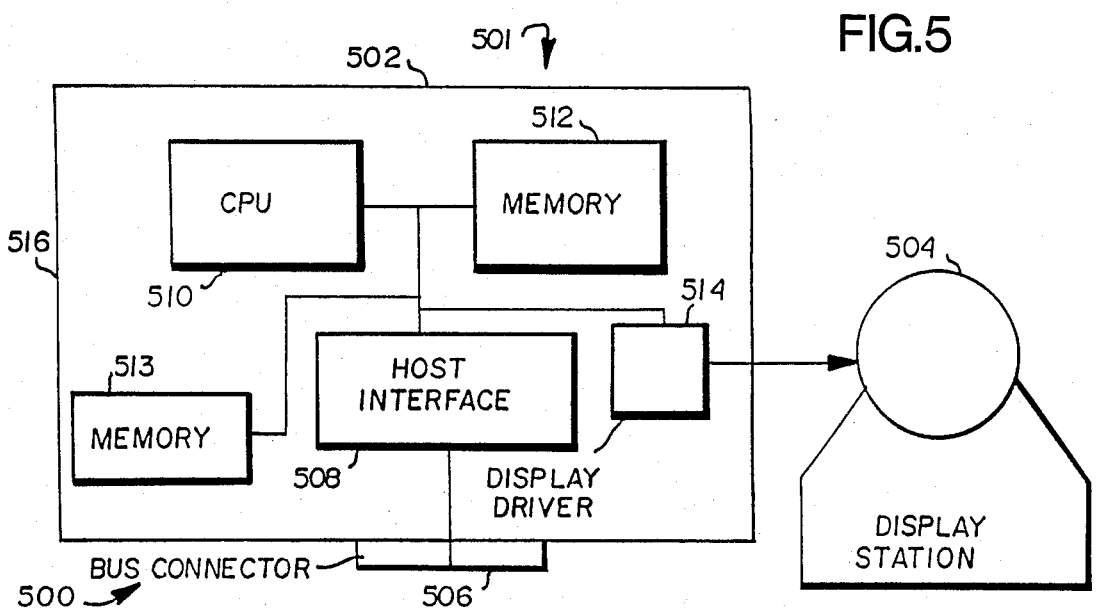
FIG. 5 is a schematic block diagram of a further presently preferred exemplary embodiment of a database usage metering and protection system in accordance with the present invention.

FIG. 5 is a block diagram of an alternate embodiment of a database usage metering and protection system 500 in accordance with the present invention. The FIG. 5 embodiment includes a dedicated independent hardware unit ("browsing workstation") 501, which can either act as a "stand-alone" or be designed to interface with additional data processing components.

Browsing workstation 501 in the preferred embodiment includes a proprietary, single-board computer 502 connected to a dedicated proprietary display station 504 having a secure environment. Computer 502 includes a bus connector 506, a host interface 508, a CPU 510, a volatile, protected memory 512, a non-volatile memory 513, and a display driver 514. Computer 502 is enclosed in a tamper-proof enclosure 516 to completely prevent access to its internal components except by authorized service personnel.

Computer 502 performs the decryption and billing functions discussed previously, and then stores the decrypted data into its own memory 512. This arrangement allows the user to review ("browse") the information (on dedicated display station 504) prior to sending desired information to his host computer (via interface 508 and connector 506) for printing or other use. Thus, the decrypted database data image is first stored and manipulated by computer 502. The user can be billed at one rate for browsing through or otherwise manipulating data in computer 502, and billed at a higher rate for transferring data to his host computer (from which the data can be printed, stored, outputted, or telecommunicated to other computers and users).

The user can evaluate the data while it is resident in computer memory 512 (via display station 504) in order to decide whether or not he really wants the information transferred to his own host computer. In this way, very different billing rates can be provided for (a)

browsing large amounts of full-text information and (b) actual use of information in the host computer (e.g., for word processing, telecommunications, printing, etc.)

Browsing workstation 501 may share some of the hardware and/or software of a host computer in order to reduce hardware costs—so long as information security is not significantly compromised. For example, one of the workstations normally connected to the host computer and its associated driver might be used in lieu of dedicated display station 504 and display driver 514 if there is little or no possibility that the user could copy a significant part of a database by reading information produced by the host computer display driver while browsing is in progress.

In a further embodiment, sophisticated software (not susceptible to manipulation or other misuse) could be temporarily loaded into the host computer (e.g., from storage medium 100) and executed to provide the functionality of some or all of the hardware "blocks" shown in FIGS. 3 or 5. Such software might use the security system provided by the host computer (and/or sophisticated techniques which are difficult to discover and "break") to create a protected environment within the host computer itself for decryption of database information and non-volatile storage of database usage information which may be adequately secure for various applications.

For example, although it may be undesirable to permit data type decryption key information to reside in the host computer permanently, the decryption key information can be temporarily provided by a protected memory device to the host computer. The host computer may then decrypt database information using the decryption key information, and destroy the key information after use. The host computer may decrypt database information "on the fly" and not retain much encrypted or decrypted information in memory at any one time to help prevent copying.

Although a dedicated hardware/software system typically provides the best assurance against tampering, techniques which may be implemented in software executing on a non-dedicated system may provide sufficient tamper resistance for some applications. For example, secure program control and usage information can be stored on a floppy disk which is accessed via the disk drive of a general-purpose non-dedicated personal computer. A non-volatile memory and logic device connected to the personal computer may (in conjunction with the secure program control software executing on the computer and/or a hardware controller connected to the computer) control and monitor the position of the read/write head of the disk drive, store the current head position in the non-volatile memory, and supervise execution of the secure program control software. Database usage information may be gathered by the program control software and stored on the floppy disk. Any attempts to tamper with the floppy disk which alters the last read/write head position may cause a warning message to be stored on the floppy disk in a database audit trail section of the disk (possibly along with cumulative messages indicating previous such occurrences) and may also result in destruction and/or disablement of the secure program control software.

While the present invention has been described with what is presently considered to be the most practical and preferred embodiments, it is to be understood that the appended claims are not to be limited to the disclosed embodiments, but on the contrary, are intended to cover modifications, variations, and/or equivalent arrangements which retain any of the novel features and advantages of this invention.

What is claimed is:

1. A secure database access system comprising:
a storage medium storing encrypted textual information;
means connected to said storage medium for selecting portions of said encrypted information and for reading said selected portions from said storage medium;
means, connected to said selecting and reading means, for decrypting said read encrypted information; and
control means connected to said decrypting means for metering usage of information decrypted by said decrypting means and for communicating said metered usage to a remote location, said control means including means for preventing said decrypting means from decrypting more than a certain quantity of information stored on said storage medium,
wherein said control means measures the number of contiguous blocks of said textual information decrypted by said decrypting means and prevents said decrypting means from decrypting more than a certain number of said contiguous blocks.

2. A system as in claim 1 wherein said control means measures the time at which said decrypting means decrypts said information and the duration of usage of said decrypted information, and wherein said metering means includes means for storing said measured time and duration.

3. A secure database access system comprising:
a storage medium storing encrypted textual information;
means connected to said storage medium for selecting portions of said encrypted information and for reading said selected portions from said storage medium;
means, connected to said selecting and reading means, for decrypting said read encrypted information; and
control means connected to said decrypting means for metering usage of information decrypted by said decrypting means and for communicating said metered usage to a remote location, said control means including means for preventing said decrypting means from decrypting more than a certain quantity of information stored on said storage medium,
said control means including:
means for communicating signals over a communications path to said centralized billing facility; and
electronic monitoring means, connected to said decrypting means and to said communicating means, for counting the number of predetermined length blocks of information decrypted by said decrypting means and for controlling said signal communicating means to communicate said count to said billing facility,
wherein said monitoring means also determines identifying characteristics of said selected portions and controls said signal communicating means to communicate said identifying characteristics to said billing facility.

4. A secure database access system comprising:

non-volatile storage means for storing a text-oriented database in digital form;

means connected to said storage means for selecting and reading portions of said stored database;

means connected to said selecting and reading means for determining the percentage of said stored database read by said selecting and reading means;

further non-volatile storage means connected to said determining means for storing information representing said determined quantity;

communicating means connected to said further storage means for periodically transmitting said stored information to a location remote thereto; and means connected to receive said stored quantity information for preventing said reading and selecting means from reading and selecting further information when said determined percentage indicated by said stored information exceeds a predetermined percentage of said database.

5. A secure data base access system comprising:

a storage medium storing a textual data base comprising characters in encrypted form, said storage medium also storing index information, said index information correlating portions of said encrypted database with unencrypted search information;

a host digital signal processor, operatively connected to said storage medium, said processor pre-programmed so as to: (a) generate unencrypted search information, (b) read said index information from said storage medium, (c) identify, in accordance with said index information, the portions of said encrypted database which satisfy said search information, and (d) read said identified encrypted database portions from said storage medium;

a non-volatile memory device;

means for decrypting portions of said encrypted database to produce corresponding decrypted information;

decoder control logic means, coupled to said host processor, said decrypting means, and said memory device, for receiving said encrypted database portions read by said host processor, for controlling said decrypting means to decrypt said portions, for measuring the quantity of information decrypted by said decrypting means, and for storing said measured quantity in said memory device; and telecommunications means connected to said non-volatile memory for periodically communicating said stored measured quantity to a distant location over a telecommunications network, for transmitting said same search information over said network, and for accessing a further, related portion of said same database over said telecommunication network in accordance with said same search information.

6. A system as in claim 5 wherein said decoder control logic means also transmits said decrypted information produced by said decrypting means to said host processor.

7. A system as in claim 5 further including means for preventing tampering with at least one of said memory device, decrypting means and decoder control logic means.

8. A system as in claim 5 further including a replaceable module adapted for disengageable connection with said decoder control logic means, said memory device being contained in said module.

9. A system as in claim 5 wherein said telecommunications means also receives certain additional information from said distant location, said decoder control logic means including means for inhibiting said decrypting means from further decrypting said database whenever said memory device becomes filled and means for resetting said memory device in response to said certain information received from said distant location.

10. A system as in claim 9 wherein:

said decoder control logic means automatically prevents said decrypting means from decrypting database portions after a predetermined event occurs unless said certain information is received by said telecommunications means.

11. A system as in claim 5 wherein:

said system further includes real time clock means connected to said decoder control logic means for producing digital signals representing the current date;

said memory device stores digital signals representing a predetermined date; and said decoder control logic means inhibits said decrypting means from operating whenever the date represented by said stored date signals is earlier than the date represented by said real time date signals.

12. A system as in claim 5 wherein said decoder control logic means includes means for causing said system to be non-functional after a predetermined event occurs unless said host processor transmits predetermined antidote information thereto.

13. A system as in claim 5 wherein:

said storage medium stores a plurality of different discrete data bases, said data bases having different selectable usage cost rates associated therewith;

said host processor selects at least one of said databases in response to said search information;

said decoder control logic means stores a designation of said selected database in said memory device with said measured quantity; and said telecommunications means communicates said stored designations to said distant location.

14. A method of accessing information comprising the steps of:

(i) providing a storage medium storing encrypted text information organized into a database thereon;

(ii) selecting portions of said encrypted information;

(iii) reading said selected portions from said storage medium;

(iv) decrypting said read information;

(v) measuring the amount of information decrypted by said decrypting step;

(vi) calculating a usage fee in response to said measured amount; and (vii) preventing decryption of more than a predetermined quantity of contiguous database information.

15. A method as in claim 14 further including the steps of:

counting the number of predetermined length contiguous database blocks of information decrypted by said decrypting step (iv);

storing said count in a non-volatile memory device;

repeating said counting and storing steps each time said selecting, reading and decrypting steps are performed, and preventing selection of further blocks contiguous with previously decrypted blocks once said counted number exceeds a preset number.

16. A method as in claim 14 wherein said method further includes the steps of:
   counting the number of predetermined length blocks of information decrypted by said decrypting step (vi);
   storing said count in a non-volatile memory device;
   periodically telecommunicating said stored count information to a centralized billing facility, said facility performing said calculating step (vi) in response to said telecommunicated information;
   periodically telecommunicating further information from said centralized billing facility and storing said further information in said memory device; and
   conditioning performance of said reading step (iii) on the presence of said further information stored in said memory device.

17. A method as in claim 14 wherein:
   said storage medium also stores unencrypted index information thereon; and
   said selecting step includes the following steps:
   (a) inputting an unencrypted, user-defined search request,
   (b) reading said unencrypted index information from said storage medium, and
   (c) identifying portions of said stored encrypted information in response to said read index information and said inputted request.

18. A method as in claim 14 wherein:
   said storage medium also stores encrypted index information thereon; and
   said selecting step includes the following steps:
   (a) inputting an unencrypted, user-defined search request,
   (b) reading said encrypted index information from said storage medium,
   (c) decrypting said read index information, and
   (d) identifying portions of said stored encrypted information in response to said decrypted index information and said inputted request.

19. A method of accessing databases comprising the steps of:
   storing digital information organized into plural discrete databases on a random access non-volatile storage device;
   selecting one of said plural databases;
   selecting discrete portions of said selected database;
   using said selected discrete portions of said selected database;
   metering said usage of each of said databases individually and generating signals indicating said usage;
   storing said usage-indicating signals in a further non-volatile storage device;
   periodically communicating said stored usage-indicating signals to a remote location; and
   inhibiting said using step whenever said metering step indicates a significant percentage of any of said plural databases has been used within a given time period.

20. A method of securing access to a database comprising the steps of:
   providing a read only random access storage medium having a database in encrypted form stored thereon and also having index information stored thereon said index information correlating portions of said encrypted database with unencrypted search information;
   generating unencrypted search information;
   reading said index information from said storage medium;
   identifying, in accordance with said index information, the specific database portions of said encrypted database which satisfy said generated search information;
   reading said identified encrypted database portions from said storage medium;
   decrypting said read portions of said encrypted database to produce corresponding decrypted information;
   measuring the quantity of information decrypted by said decrypting step;
   storing said measured quantity in a non-volatile memory device; and
   inhibiting said decrypting step from decrypting more than a certain percentage of said encrypted database in response to said quantity measured by said measuring step thereby preventing copying of a significant portion of said database.

21. A method of securing access to a database comprising the steps of:
   providing a random access mass storage medium having a database stored thereon and also having index information correlating portions of said database with encrypted source information stored thereon;
   generating search information;
   reading said index information from said storage medium;
   identifying, in accordance with said index information, the specific portions of said database which correspond to said generated search information;
   reading said specific identified database portions from said storage medium;
   decrypting said specific identified portions of said encrypted source to produce corresponding decrypted information;
   measuring the quantity of information decrypted by said decrypting step;
   storing said measured quantity in a non-volatile memory device; and
   inhibiting said decrypting step from decrypting more than a predetermined percentage of said source in response to said quantity measured by said measuring step, thereby preventing copying of a significant portion of said database.

22. A method as in claim 21 wherein:
   said index information decrypting step comprises decrypting said index information using a first decryption technique; and
   said encrypted database portions decrypting step comprises decrypting said database portions using a predetermined second decryption technique different from said first technique.

23. A method as in claim 21 further including:
   generating a real time clock signal; and
   storing said clock signal along with said measured information in said memory device.

24. A method of distributing literary properties comprising the steps of:
   (i) providing, to a user at a user site, a storage medium having plural different text-oriented literary properties stored thereon in digital form, rights in said text-oriented properties being owned by different property owners;
   (ii) permitting the user to select and electronically access said stored properties and preventing the user from copying more than a certain percentage of said stored properties using a digital signal processor at said user site connected to a non-volatile storage device also at said user site;

(iii) storing with said digital processor digital signals identifying said selected properties in said non-volatile storage device in response to database accesses by the user in accordance with said permission provided by said permitting step (ii);

(iv) periodically communicating said stored digital signals from said digital processor to a central billing facility remote to said user site via a telecommunications network;

(v) determining, in response to said communicated digital signals communicated by said communicating step (iv), a user charge based on actual access of the properties stored on said storage medium by the user in accordance with said permission provided by said permitting step (ii);

(vi) subsequent to said determining step (v), collecting the user charge determined by said determining step (v) from said user; and (vii) apportioning said user charge collected in said collecting step (vi) between said different property owners in accordance with said actual access of said properties by said user in accordance with said permission provided by said permitting step (ii).

25. A method as in claim 24 further including the step of preventing information stored in said non-volatile storage device from being tampered with.

26. A method as in claim 24 wherein:
said method further includes the step, performed prior to said permitting step, of telecommunicating certain information from a distant location and storing said certain information into said non-volatile storage device;
said communicating step includes telecommunicating said digital signals stored by said storing step (iii) to said distant location periodically; and
said method further includes inhibiting said preventing step whenever said certain information is not stored in said storage device.

27. A method as in claim 24 further including:
coding at least portions of said properties so that said portions cannot be readily understood; and
decoding portions of said properties selected by said user so that said portions can be readily understood only when said certain information is stored in said storage device.

28. A secured browsing workstation comprising:
means, connected to receive encrypted information transmitted thereto by a host digital signal processor, for decrypting said encrypted information;
display means, operatively coupled to said decrypting means, for displaying selected portions of said decrypted information;
user interface means, manipulable by a user, for selecting information portions to be displayed and for selecting information portions to be further processed;
data transmitting means, connected to said interface means and operatively connected to said decrypting means, for transmitting said portions selected for further processing by said host digital signal processor; and
billing information generating means, connected to said user interface means, for generating billing information in response to information use, said generating means applying different billing rates for display of decrypted information and for further processing of decrypted information, said billing information generating means including means for generating an indication of total charges, and means for comparing said total charges to a predetermined credit and for inhibiting said data transmitting means from transmitting said portions to said host processor whenever said total charges exceed said predetermined credit.

29. A workstation as in claim 28 further including means for preventing electronic access to said information decrypted by said decrypting means and not transmitted by said transmitting means.

30. A workstation as in claim 28 further including:
non-volatile memory means for storing said billing information and said predetermined credit; and
means for communicating said stored billing information to a location remote from said browsing workstation location and for communicating said credit from said remote location to said non-volatile memory means.

31. A workstation as in claim 28 wherein:
said workstation further includes non-volatile memory means, connected to said billing information generating means, for storing said billing information; and
means for periodically connecting said memory means to a location remote from said browsing workstation location via a telephone line.

32. A method of securing access to a database comprising the steps of:
(a) providing a storage medium having digital signals representing a database stored thereon;
(b) selecting portions of said database;
(c) extracting signals representing said selected database portions from said storage medium;
(d) storing at least one characteristic of said selected portions in a non-volatile memory device;
(e) repeating said selecting step (b);
(f) reading stored characteristics from said memory device;
(g) determining whether a database portion selected by said repeated selecting step (b) has a logical relationship with database portions earlier selected by said selecting step (b); and
(h) inhibiting said extracting step (c) if said determining step reveals said logical relationship exists to thereby prevent copying of any substantial portion of information of said database,
wherein said determining step (g) includes the step of determining whether signals representing more than a predetermined percentage of said database have been extracted.

33. A method as in claim 32 wherein said method further includes the step of dynamically specifying said logical relationship.

34. A method as in claim 32 wherein said non-volatile memory device stores data portion characteristics associated with data signals extracted by said extracting step during a predetermined period of time.

35. A method of securing access to a database comprising the steps of:
(a) providing a storage medium having digital signals representing a database stored thereon;
(b) selecting portions of said database;
(c) extracting signals representing said selected database portions from said storage medium;

(d) storing at least one characteristic of said selected portions in a non-volatile memory device;
(e) repeating said selecting step (b);
(f) reading stored characteristics from said memory device;
(g) determining whether a database portion selected by said repeated selecting step (b) has a logical relationship with database portions earlier selected by said selecting step (b); and
(h) inhibiting said extracting step (c) if said determining step reveals said logical relationship exists to thereby prevent copying of any substantial portion of information of said database,
wherein said data is organized in sequential blocks, and said determining step (g) includes the step of determining whether signals representing more than a predetermined number of sequential blocks of said database have been extracted.

36. A method of securing access to a database comprising the steps of:
(a) providing a storage medium having digital signals representing a database stored thereon;
(b) selecting relatively small portions of said database;
(c) extracting signals representing said selected database portions from said storage medium;
(d) storing at least one characteristic of said selected portions in a non-volatile memory device;
(e) repeating said selecting step (b);
(f) reading stored characteristics from said memory device;
(g) determining whether a database portion selected by said repeated selecting step (b) has a logical relationship with database portions earlier selected by said selecting step (b); and
(h) inhibiting said extracting step (c) if said determining step reveals said logical relationship exists to thereby prevent copying of any substantial portion of information of said database,
said method further including the step of specifying a maximum cost value;
wherein said determining step includes the steps of:
calculating a total cost based on the quantity of extracted data portions associated with said stored characteristics, and
determining whether said calculated total cost exceeds said specified cost value; and
wherein said inhibiting step inhibits said extracting step whenever said calculated total cost exceeds said specified cost value.

37. Apparatus for accessing a stored database comprising:
a storage medium having digital signals representing a database stored thereon;
means operatively associated with said storage medium for selecting portions of said database and for non-destructively extracting signals representing said selected database portions from said storage medium;
non-volatile memory means connected to said selecting and extracting means for storing at least one characteristic of said selected portions in a non-volatile memory device and for retaining said stored characteristics; and
means connected to said non-volatile memory means and to said selecting and extracting means for determining whether a characteristic of data portions selected by said selecting and extracting means has a predetermined relationship with characteristics retained by said memory means and for inhibiting said selecting and extracting means from extracting said selected data portions if said testing reveals said predetermined relationship exists to thereby prevent copying of a substantial portion of said database over time,
wherein said determining means includes means for determining whether signals representing more than a predetermined percentage of said data has been extracted.

38. Apparatus as in claim 37 further including means for permitting a user to specify said preprogrammed relationship.

39. Apparatus as in claim 37 wherein:
said apparatus further includes means for permitting a user to specify a maximum cost value; and
said determining means comprises a digital signal processor preprogrammed so as to perform the following functions:
calculate a total cost based on the quantity and other usage parameter of extracted data portions associated with said stored characteristics, and
determining whether said calculated total cost exceeds said user-specified cost value.

40. Apparatus as in claim 37 wherein said non-volatile memory means stores data portion characteristics associated with data signals extracted by said extracting step during a predetermined period of time.

41. Apparatus for accessing a stored database comprising:
a storage medium having digital signals representing a database stored thereon;
means operatively associated with said storage medium for selecting portions of said database and for non-destructively extracting signals representing said selected database portions from said storage medium;
non-volatile memory means connected to said selecting and extracting means for storing at least one characteristic of said selected portions in a non-volatile memory device and for retaining said stored characteristics; and
means connected to said non-volatile memory means and to said selecting and extracting means for determining whether a characteristic of data portions selected by said selecting and extracting means has a predetermined relationship with characteristics retained by said memory means and for inhibiting said selecting and extracting means from extracting said selected data portions if said testing reveals said predetermined relationship exists to thereby prevent copying of a substantial portion of said database over time,
wherein said data is organized in sequential blocks, and said determining means includes means for determining whether signals representing more than a predetermined number of sequential blocks of said data have been extracted.

* * * * *

UNITED STATES PATENT AND TRADEMARK OFFICE
CERTIFICATE OF CORRECTION

PATENT NO. : 4,827,508
DATED : May 2, 1989
INVENTOR(S) : Victor H. Shear

It is certified that error appears in the above-identified patent and that said Letters Patent is hereby corrected as shown below:

On the title page, Item (22),"Oct. 14, 1985" should read -- Oct. 14, 1986 --.

Signed and Sealed this

Ninth Day of October, 1990

Attest:

HARRY F. MANBECK, JR.

*Attesting Officer*   *Commissioner of Patents and Trademarks*